United States Patent Office 3,655,583
Patented Apr. 11, 1972

3,655,583
VANADYE COMPOUND HAVING CYCLIC HYDRO-
CARBON SUBSTITUENT AND POLYMERIZA-
TION CATALYST CONTAINING SAID COM-
POUND
Keisaku Yamamoto, Ibaraki, Hiroyoshi Takao, Takatsuki,
Masaaki Hirooka, Ibaraki, and Teruo Oshima, Nishino-
miya, Japan, assignors to Sumitomo Chemical Com-
pany, Limited, Osaka, Japan
No Drawing. Filed July 23, 1969, Ser. No. 844,178
Claims priority, application Japan, July 30, 1968,
43/53,816
Int. Cl. C08f *15/04, 3/02, 3/04*
U.S. Cl. 252—431                                          24 Claims

ABSTRACT OF THE DISCLOSURE

Novel vanadyl compounds of the formula $$VO(OR)_mX_{3-m}$$

where R is a group containing a cyclic hydrocarbon having 5 to 20 carbon atoms, X is a halogen atom and $m$ is an integer from 1 to 3, are mixed with organoaluminum compounds to make catalysts useful for homopolymerizing or copolymerizing alpha-monoolefins in solution, if desired with a polyene such as a conjugated or non-conjugated diene. Examples of the vanadium compounds are vanadyl tricyclohexoxide, monochlorovanadyl dicyclohexoxide, vanadyl tribornyloxide and monochlorovanadyl dinor-bornylmethoxide. Conjugated dienes have less retarding effect on the catalyst than on conventional catalyst.

---

Our copending application Ser. No. 84,187 filed on even date herewith claims a process for copolymerizing alpha-monoolefins using the catalyst herein disclosed.

The present invention relates to a novel polymerization catalyst for an olefinic hydrocarbon, which comprises as the essential components a novel vanadium compound and an organic aluminum compound. In more particular, the present invention relates to a polymerization catalyst for an olefinic hydrocarbon suitable for the production of an amorphous olefin copolymer into which a polyene compound is effectively introduced.

There have heretofore been proposed various polymerization catalysts for the production of amorphous olefin copolymers. Ziegler-Natta type catalyst are specifically effective and among them, the combinations of a vanadium compound with an organoaluminum compound are excellent. Representative kinds of such vanadium compounds includes halogen compounds, alkoxy compounds, acetyl acetonates and the like. These have industrial merit for the purpose of producing an amorphous copolymer.

In producing sulfur-vulcanizable rubbery compounds by copolymerizing ethylene, α-olefins, diene compounds or other polyene compounds with the use of the Ziegler-Natta type catalysts, the diene compounds or other polyene compounds, particularly conjugated diene compounds, have in general retarding effect on the polymerization.

Italian Pat. No. 664,769 (British Pat. No. 983,437) proposes a polymerization catalyst containing an organo-aluminum compound in which a sterometrically bulky group is introduced in order to carry out readily the copolymerization of conjugated diolefins.

In general, the Ziegler-Natta type catalysts which use vanadium compounds containing alkoxy groups such as vanadyl trialkoxide $VO(OR)_3$, mono-halogenated vanadyl alkoxide $VO(OR)_2X$ and di-halogenated vanadyl monoalkoxide $VO(OR)X_2$ are suitable for the production of a copolymer having narrow molecular weight distribution and composition distribution, and produce a high yield of copolymers per a unit weight of the catalysts.

The use of such a compound containing an alkoxy group as a catalyst in the polymerization and copolymerization of olefins has been proposed in Japanese patent publication No. 7,394/1961, Japanese patent publication No. 7,132/1963, Japanese patent publication No. 13,790/1963 and the like. The hydrocarbon residue in the disclosed alkoxy groups is a straight-chain or branched-chain alkyl group.

The active site of Ziegler-Natta type catalysts in the polymerization has been reported to exist on the transition metal. However, the effect of a stereometrically bulky group attached to a transition metal compound has not been known.

The present inventors have found that when a stereometrically bulky group containing a cyclic hydrocarbon having 5 or more carbon atoms such as, particularly a cycloaliphatic hydrocarbon group, including bridged cyclohydrocarbon group, spiro type hydrocarbon group and the like is introduced as the afore-described hydrocarbon residue, and the resulting novel vanadium compound is used as one component of the catalyst, such catalyst has excellent polymerization activity. It has been found that this kind of novel polymerization catalysts is effective in the polymerization of olefinic hydrocarbons in general, particularly ethylene, propylene or other α-olefins, including the copolymerization of ethylene with α-olefins and the copolymerization of ethylene or α-olefins with diene compounds, polyene compounds or the like.

That is to say, the present invention relates to a polymerization catalyst for an olefinic hydrocarbon, consisting essentially of (A) a vanadium compound having the general formula $VO(OR)_mX_{3-m}$ wherein R is a group containing a cyclic hydrocarbon having 5 to 20 carbon atoms, X is a halogen atom and $m$ is an integer from 1 to 3, and (B) an organoaluminum compound having the general formula $AlR'_nX'_{3-n}$ wherein R' is a hydrocarbon group having 1 to 20 carbon atoms, X' is a halogen or hydrogen atom and $n$ is a number from 1 to 3.

Further, the present invention relates to a polymerization catalyst for an olefinic hydrocarbon, consisting essentially of an (A) component and a (B) component, said (A) component being a product containing a vanadium compound obtained by (a) contacting a vanadium compounds having the general formula $VO(OR'')_mX_{3-m}$ wherein R" is an alkyl group having 1 to 5 carbon atoms, X is a halogen atom and $m$ is an integer from 1 to 3, with an alcohol having the general formula ROH wherein R is a group containing a cyclic hydrocarbon having 5 to 20 carbon atoms, (b) contacting vanadyl trichloride with an alcohol having the general formula ROH wherein R has the same significance as mentioned above, or (c) contacting a vanadium compound having the general formula VO(OR)$_3$ wherein R has the same significance as mentioned above, with a carboxylic halide having the general formula R″COCl wherein R″ has the same significance as mentioned above, and said (B) component being an organo-aluminum compound as defined above.

The cyclic hydrocarbon radical represented by R in the general formula for the vanadium compound (A) can include, for example, an alicyclic hydrocarbon group, bridged cyclic hydrocarbon group, spiro type hydrocarbon group and the like. These groups are exemplified by cyclopentyl, cyclohexyl, cycloheptyl, cyclooctyl, 3-cyclopentenyl, 2-cyclohexenyl, 2-cycloheptenyl, 4-cyclooctenyl, 2-methylcyclopentyl, 3-tertiary-butyl-cyclohexyl, 4-phenyl-cyclohexyl, 1,3-dimethyl-cyclohexyl, 3-methyl-6-isopropyl-cyclohexyl, cyclopentyl-methyl, cyclohexyl-ethyl, cycloheptyl-ethyl, 2,2-dicyclohexyl-ethyl, 2-norbornyl, bornyl, 5-norbornen-2-yl, 3-pinanyl, cyclopentane-spiro-cyclobutan-3′-yl, spiro-bicyclohexan-4-yl, 2-indenyl, 1-indanyl and the like. The foregoing cyclic groups contain not more than one olefinic double bond, that is, no olefinic double bond or one olefinic double bond.

Compounds having such groups are illustrated by
vanadyl-tricyclopentoxide,
vanadyl-tricyclohexoxide,
vanadyl-tri-(3-cyclopenenoxide),
vanadyl-tri-(3-methyl-cyclohexoxide),
vanadyl-tri-(3-tertiary-butyl-cyclohexoxide),
vanadyl-trimenthoxide,
vanadyl-tri-(cyclohexyl-methoxide),
vanadyl-tribornyloxide,
vanadyl-tri-(5-norbornen-2-yloxide),
vanadyl-tri-(2-indanyloxide),
chloro-vanadyl-di-(cyclopentoxide),
chloro-vanadyl-di-(cyclohexoxide),
chloro-vanadyl-di-(3-cyclopentenoxide),
chloro-vanadyl-di-(3-methyl-cyclohexoxide),
chloro-vanadyl-di-(3-tertiary-butyl-cyclohexoxide),
chloro-vanadyl-di-(menthoxide),
chloro-vanadyl-di-(cyclohexylmethoxide),
chloro-vanadyl-di-(bornyloxide),
chloro-vanadyl-di-(5-norbornene-2-yloxide),
chloro-vanadyl-di-(2-indanyloxide),
dichloro-vanadyl-cyclopentoxide,
dichloro-vanadyl-cyclohexoxide,
dichloro-vanadyl-(3-cyclopentenoxide),
dichloro-vanadyl-(3-methyl-cyclohexoxide),
dichloro-vanadyl-(tertiary-butyl-cyclohexoxide),
dichloro-vanadyl-menthoxide,
dichloro-vanadyl-(cyclohexylmethoxide),
dichloro-vanadyl-bornyloxide,
dichloro-vanadyl-(5-norbornen-2-yloxide),
dichloro-vanadyl-(2-indanyloxide), and the like. It will be noted that in each of the foregoing the oxygen of the OR group is attached to an endocyclic carbon atom in a cycloaliphatic moiety or an aliphatic carbon atom.

These novel vanadium compounds may be synthesized by various procedures, for example, in accordance with the following processes:

(a) A vanadium compound having the general formula VO(OR″)$_n$X$_{3-n}$ wherein R″ is an alkyl group having 1 to 5 carbon atoms, X is a halogen atom, and n is an integer of 1 to 3 is contacted with an alcohol having the general formula ROH wherein R is a group containing a cyclohydrocarbon having 5 to 20 carbon atoms.

(b) Vanadyl trichloride is contacted with an alcohol having the general formula ROH wherein R has the same significance as mentioned above.

(c) A vanadium compound having the general formula VO(OR)$_3$ wherein R has the same significance as mentioned above is contacted with a carboxylic halide having the general formula R″COCl wherein R″ has the same significance as mentioned above.

The vanadyl trialkoxide compounds referred to in the present invention may be synthesized, for example, by ester interchange reaction between an alcohol (ROH) having said group containing the cyclic hydrocarbon and vanadyl triethoxide in an inert solvent, and thereafter removing an azeotrope of ethanol and solvent. The reaction proceeds as follows:

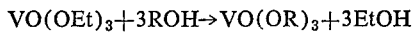
VO(OEt)$_3$+3ROH→VO(OR)$_3$+3EtOH

Further, the vanadyl halogen alkoxides may be synthesized, for example, by reacting a vanadyl trialkoxide having said group containing the cyclic hydrocarbon with acetyl chloride in an inert solvent, and thereafter removing the solvent and acetic ester therefrom. The reaction proceeds as follows:

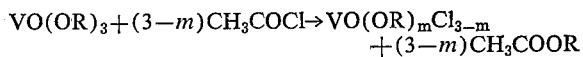
VO(OR)$_3$+(3−m)CH$_3$COCl→VO(OR)$_m$Cl$_{3-m}$
　　　　　　　　　　　　　　　+(3−m)CH$_3$COOR Furthermore, a vanadyl trialkoxide compound or a vanadyl halogen alkoxide may be produced by reacting vanadyl trichloride with an alcohol having a group containing the foregoing cyclic hydrocarbon in an inert solvent. The reaction proceeds as follows:

VOX$_3$+mROH→VO(OR)$_m$X$_{3-m}$+mHX

In the case where 2 or more of groups containing the cyclic hydrocarbon exist in the vanadium compounds thus produced, said groups may of course be identical with or different from one another.

Further, these vanadium compounds are not required to be single compounds, and mixtures 2 kinds or more of said compounds and in some cases, reaction mixtures produced by the foregoing various reactions may also be used as they are as one component of the polymerization catalysts.

These reactions may be carried out in the absence of a solvent, but are more efficaciously carried out in an inert solvent.

As a solvent a hydrocarbon compound or a halogenated hydrocarbon compound is preferred.

For example, there may be mentioned hexane, heptane, octane, petroleum ether, ligroin, other petroleum fractions, benzene, toluene, xylene, cyclohexane, methyl cyclohexane, methylene dichloride, ethylene dichloride, chlorobenzene and the like.

In particular, the use of an aromatic hydrocarbon compound such as benzene and the like is preferred because it forms an azeotrope with the alcohol or ester, and the reaction proceeds uniformly. The use of an aliphatic hydrocarbon such as heptane causes the tar-like materials to be formed as by-products in some cases. However, the aromatic compounds usually give a uniform system.

Another component of the present polymerization catalyst is an organoaluminum compound which is represented by the general formula AlR′$_n$X′$_{3-n}$. In said general formula, R′ is a group such as an alkyl, aryl, aralkyl, alkylaryl, cycloalkyl and the like, and is particularly preferred to be an alkyl group having 1 to 8 carbon atoms. Further, said R′ may be other hydrocarbon groups, for example, a group such as alkenyl, cyclopentadienyl and the like, if desired.

X′ is chlorine, bromine or iodine, and may be fluorine if desired, and n is a positive number of 3 or less, preferably 1, 1.5, 2 or 3. These compounds are exemplified by methylaluminum dichloride, ethyl aluminum dichloride, isobutyl aluminum dichloride, ethyl aluminum dibromide, allyl aluminum dichloride, vinyl aluminum dichloride, ethyl aluminum sesquichloride, methyl aluminum sesquichloride, methyl aluminum sesquibromide, ethyl aluminum sesquiiodide, isobutyl aluminum sesquichloride, hexyl aluminum sesquichloride, diethyl aluminum chloride, diethyl aluminum bromide, dipropyl aluminum chloride, didodecyl aluminum chloride, diethyl aluminum fluoride, ethylphenyl aluminum chloride, trimethyl aluminum, triethyl aluminum, tripropyl aluminum, tri-isobutyl aluminum, trihexyl aluminum, tridecyl aluminum, aluminum hydride, mixtures of these compounds, mixtures thereof with halogenated aluminum such as aluminum chloride, aluminum bromide and aluminum iodide, and the like. Among these organoaluminum compounds, an alkylaluminum halogen compound specifically gives the preferred result.

The present catalysts comprise the vanadium compounds and organic aluminum compounds as essential components as described above, but may contain, if required, other appropriate compounds as a third component. As said compounds, there can be exemplified, for example, a compound which is an electron-donor compound and forms a coordination compound or an charge transfer complex with the organoaluminum compounds or vanadium compounds, e.g. amines, cyclo-nitrogen compounds, acid amides, ethers, esters, ketones and aldehydes, a compound of elements in the $V^b$ Group such as phosphorus, arsenic, antimony, bismuth and the like, various chelating agents or the like. Or, there are available various oxidizing compounds which are considered effective for preventing from the excessive reduction of the vanadium compounds by the organic aluminum compounds. Among these may be mentioned halogens, sulfur, metal halides, oxygen, nitro compounds, nitroso compounds, organic nitrates, nitrites, N-oxide compounds, p-oxide compounds, azo compounds, organic sulfides, disulfides, quinones, acid halides and the like.

The present novel polymerization catalysts can be used for the polymerization of olefinic hydrocarbons, particularly ethylene and α-olefins, the copolymerization of ethylene with α-olefins and the copolymerization of ethylene, α-olefins and polyene compounds or the like. The α-olefins used for the foregoing homopolymerization, copolymerization with ethylene and three-component copolymerization are represented by the general formula $CH_2=CH.R'''$ wherein $R'''$ is a hydrocarbon group having 1 to 20 carbon atoms. As representatives of said α-olefins, there may be mentioned propylene, butene-1, pentene-1, 3-methyl-butene-1, hexene-1, 3-methyl-pentene-1, 4-methyl-pentene-1, heptene-1, decene-1, vinyl cyclopentane and the like. Among these, a lower alkene such as propylene, butene-1 and the like is specifically often used.

A sulfur-vulcanizable elastomer can be produced by adding a polyene compound in the production of an amorphous copolymer of ethylene and α-olefins. As this kind of polyene compound, there can be used conjugated diene compounds such as isoprene, piperylene and the like and non-conjugated polyene compounds such as bridged cyclic hydrocarbon compounds, mono-cyclic compounds, hetero-cyclic compounds, acyclic compounds, spiro type compounds and the like. As the non-conjugated polyene compounds, there may be mentioned as examples dicyclopentadiene, 5-methylene-2-norbornene, 5-ethylidene-2-norbornene, 5-isopropylidene-2-norbornene, 5-isopropenyl-2-norbornene, cyclo-octadiene, 6-methyl-4,7,8,9-tetrahydroindene, 1,4-hexadiene, 1,6-octadiene and the like. Even aliphatic diene compounds which have heretofore been known not to copolymerize readily can be copolymerized readily.

There is specifically no restriction in the raito between the organic aluminum compounds and the vanadium compounds used in the present polymerization catalysts, but the use of a molar ratio of 1:1 to 10,000:1 and the like, particularly 2:1 to 300:1, brings about the preferred result readily. Regarding in the concentration in the reaction medium, a concentration of vanadium compounds of 0.01 to 50 millimoles/l., particularly 0.1 to 10 millimoles/l., is often used. However, in some cases, even a lower concentration of 0.01 millimole/l. or less, for example, the order of $10^{-4}$ millimole/l., shows excellent activity. As the concentration of the organic aluminum compounds in the reaction system, a concentration of 0.1 to 100 millimoles/l., particularly 1 to 20 millimoles/l., is often used.

In the use of the present polymerization catalysts, there is specifically no restriction in the sequence of addition of the catalysts and monomers, and the addition thereof may be carried out in accordance with conventional procedure. However, in general, the procedure of adding separately the catalyst components (A) and (B) to the polymerization system in the presence of monomers gives higher catalytic activity than does the use of a pre-mixture of said catalyst components. However, in view of the change in the catalytic activity with elapsed time there are some cases where it is better to use a product obtained by mixing and reacting the catalyst components in advance.

The monomer components, particularly the polyene compounds, may be dissolved in advance in the reaction medium or may be added continuously or intermittently.

The present process will be further substantially explained with reference to the following examples. However, the present process is not to be limited at all by said examples.

EXAMPLE 1

A 150 ml. four-necked flask provided with a stirrer, thermometer, reflux condenser and dropping funnel was evacuated and filled with argon. Then 20.1 g. (100 millimoles) of vanadyl triethoxide dissolved in 50 ml. of benzene was charged.

Subsequently, 31.2 ml. (300 millimoles) of cyclohexanol were added thereto and refluxing was effected at an external temperature of 90° to 100° C. for about 2 hours.

The ethanol produced was removed from the reaction mixture along with benzene by azeotropic distillation and unreacted materials were removed by distillation under reduced pressure.

As the reaction product, there was obtained 25.5 g. of vanadyl tricyclohexoxide. The product was a yellow crystalline solid having a melting point of 44.5° C.

Reference Example 1

One litre of normal heptane was charged to a 2 l. flask. The flask was placed in a thermostat at 30° C., and a mixed gas of 40 mole percent of ethylene and 60 mole percent of propylene was passed in at the rate of 10 Nl./min. to saturate the charged normal heptane. Subsequently, 3 millimoles of ethylaluminum sesiquichloride ($AlEt_{1.5}Cl_{1.5}$) and 0.3 millimole of vanadyl tricyclohexoxide were added in that order and subsequently, ethylene and propylene were passed in for 30 minutes while stirring. Thirty millilitres of methanol were added to the reaction mixture to stop the reaction. After washing the reaction mixture sufficiently with methanol, the reaction mixture was charged into a large amount of methanol to coagulate the copolymer. After, drying the coagulum, there were obtained 28.4 g. of a white amorphous solid copolymer.

The intrinsic viscosity of said copolymer in a xylene solution was 2.40 dl./g. at 70° C. A propylene content of a copolymer obtained from infrared absorption spectrum was 40.8 mole percent.

Using vanadyl trichloride in place of vanadyl tricyclohexoxide, only 23.5 g. of the copolymer was obtained, which shows that vanadyl tricyclohexoxide is higher in polymerization activity than vanadyl trichloride.

In carrying out the polymerization under the same condition as mentioned above except for the use of butene-1 in place of propylene, there were obtained 16.3 g. of copolymer.

EXAMPLE 2

A 100 ml. four-necked flask provided with a stirrer, thermometer, reflux condenser and dropping funnel was evacuated and filled with argon, and, 14.3 g. (39.3 millimoles) of vanadyl tricyclohexoxide dissolved in 25 ml. of benzene was charged. Then, 2.79 ml. (39.3 millimoles) of acetyl chloride dissolved in 10 ml. of benzene were gradually added dropwise thereto while stirring.

After completion of the dropwise addition, the mixture was refluxed at an external temperature of 100° C. for about 1 hour.

Removing the solvent and cyclohexyl acetate from the reaction mixture by distillation, there were obtained 12 g. of monochloro-vanadyl-dicyclohexoxide.

Reference Example 2

Five hundred millilitres of normal heptane were charged into a 1 l. flask and maintained at 25° C. Ethylene was passed in at the rate of 1.5 Nl./min. under normal pressure to saturate the heptane. 10 millimoles of ethylaluminum dichloride and 0.032 millimole of monochlorovanadyl-dicyclo-hexoxide were added, and ethylene was passed in at the rate of 1.5 Nl./min. while stirring for 1 hour. There were obtained 12.85 g. of a white solid polymer having an intrinsic viscosity 3.77 dl./g.

Reference Example 3

To a 100 ml. autoclave was added 30 ml. of normal heptane, and then propylene was fed at 40° C. The pressure in the autoclave was maintained at 5 kg./cm.$^2$g. 3.80 millimoles of triethylaluminum and 1.27 millimoles of monochloro-vanadyl-dicyclohexoxide were added and the reaction was effected for 3 hours while stirring. There were obtained 10.2 g. of a white solid polymer having an intrinsic viscosity of 4.47 dl./g.

EXAMPLE 3

Reacting 10 g. (50 millimoles) of vanadyl triethoxide with 23.1 g. (150 millimoles) of borneol in the same manner as in Example 1, then removing benzene and ethanol by azeotropic distillation, and further distilling off unreacted materials under reduced pressure, there were obtained 25.7 g. of a light yellow solid vanadyl tribornyloxide.

EXAMPLE 4

Mixing and reacting a solution of 2.98 g. (24 millimoles) of 5-hydroxymethyl-2-norbornene in 20 ml. of benzene and a solution of 2.08 g. (12 millimoles) of vanadyl trichloride in 20 ml. of benzene in the presence of argon, there was prepared a benzene solution of chlorovanadyl-dinorbornyl-methoxide having a concentration of 0.3 millimole/ml.

Reference Example 4

To a 2 l. flask was charged 1 l. of normal heptane. A mixed gas of 40 mole percent of ethylene and 60 mole percent of propylene was passed in to saturate the normal heptane at 15° C.

Adding 80 millimoles of isoprene, 3 millimoles of ethylaluminum sesquichloride and 0.3 millimole of monochloro-vanadyl-dicyclohexoxide thereto, the reaction was effected for 50 minutes while stirring and passing in the mixed gas at the foregoing rate. Treating the reaction mixture obtained in the same manner as in Reference Example 1, there were obtained 16.1 g. of a white solid copolymer having an intrinsic viscosity of 0.85 dl./g., a propylene content of 21.5 mole percent and an iodine value of 3.6.

Repeating the afore-described reaction with vanadyl trichloride in place of monochloro-vanadyl-dicyclo hexoxide, there were obtained 7.83 g. of an amorphous copolymer having an intrinsic viscosity of 1.32 dl./g., a propylene content of 35.3 mole percent and an iodine value of 0.9.

As is obvious from these experiments, the diene has less retarding effect and copolymerizes more readily, with monochloro-vanadyl-dicyclohexoxide.

Reference Example 5

To a 2 l. flask was charged 1 l. of normal heptane. A mixed gas of 40 mole percent of ethylene and 60 mole percent of propylene and hydrogen were passed in at the rates of 10 Nl./min. and 2 Nl./min. respectively at 30° C. to saturate the normal heptane. Adding 10 millimoles of 5-ethylidene-2-norbornene, 4 millimoles of ethylaluminum sesquichloride and 0.2 millimole of vanadyl tricyclohexoxide, the reaction was effected for 30 minutes while stirring and passing the mixed gas and hydrogen at the foregoing rates. Treating the reaction mixture obtained in the same manner as in Reference Example 1, there were obtained 15.8 g. of a white solid copolymer having an intrinsic viscosity of 1.50 dl./g., a propylene content of 36.3 mole percent and an iodine value of 19.5.

What we claim is:

1. A catalyst for polymerization of olefinic hydrocarbons comprising (A) a vanadium compound having the general formula $VO(OR)_mX_{3-m}$ in which R is a cycloaliphatic hydrocarbon radical having 5 to 20 carbon atoms, X is a halogen atom and $m$ is an integer from 1 to 3, and (B) an organoaluminum compound having the general formula $AlR'_nX'_{3-n}$, in which R' is a hydrocarbon radical having 1 to 20 carbon atoms, X' is a halogen atom or hydrogen atom and $n$ is a number from 1 to 3.

2. A catalyst as in claim 1 in which the said cyclic hydrocarbon radical is cyclohexyl.

3. A catalyst as in claim 2 in which the vanadium compound is vanadyl tricyclohexoxide.

4. A catalyst as in claim 2 in which the vanadium compound is monochlorovanadyl-dicyclohexoxide.

5. A catalyst as in claim 1 in which the said cyclic hydrocarbon radical is bornyl.

6. A catalyst as in claim 5 in which the vanadium compound is vanadyl tribornyloxide.

7. A catalyst as in claim 1 in which the said cyclic hydrocarbon radical is norbornyl.

8. A catalyst as in claim 7 in which the vanadium compound is chlorovanadyl dinorbornylmethoxide.

9. A catalyst as in claim 1 in which (B) is an alkyl aluminum halide.

10. A catalyst as in claim 9 in which (B) is an alkyl aluminum sesquihalide.

11. A catalyst as in claim 9 in which (B) is an alkyl aluminum dihalide.

12. A catalyst as in claim 1 in which (B) is a trialkyl aluminum.

13. A catalyst for polymerization of olefinic hydrocarbons comprising (A) a vanadium compound having the general formula $VO(OR)_mX_{3-m}$, in which R is a cyclic hydrocarbon radical selected from the group consisting of cyclopentyl, cyclohexyl, cycloheptyl, cyclooctyl, 3-cyclopentenyl, 2-cyclohexenyl, 2-cycloheptenyl, 4-cyclooctenyl, 2-methyl-cyclopentenyl, 3 - tertiaryl-butyl-cyclohexyl, 4-phenyl-cyclohexyl, 1,3-dimethyl-cyclohexyl, 3 - methyl-6-isopropyl-cyclohexyl, cyclopentyl-methyl, cyclohexyl-ethyl, cycloheptyl-ethyl, 2,2-biscyclo-hexyl-ethyl, 2 - norbornyl, bornyl, 5-norbornen-2-yl, 3-pinanyl, cyclopentane-spiro-cyclobutan-3'-yl, spiro-bicyclohexan-4-yl, 2-indenyl, and 1-indanyl, X is a halogen atom and $m$ is an integer from 1 to 3, and (B) an organo-aluminum compound having the general formula $AlR'_nX'_{3-n}$, in which R' is an alkyl group having 1 to 8 carbon atoms, X' is a halogen atom or hydrogen atom, and $n$ is a number from 1 to 3.

14. A catalyst as in claim 13 in which the said cyclic hydrocarbon radical is cyclohexyl.

15. A catalyst as in claim 14 in which the vanadium compound is vanadyl tricyclohexoxide.

16. A catalyst as in claim 14 in which the vanadium compound is monochlorovanadyl-dicyclohexoxide.

17. A catalyst as in claim 13 in which said cyclic hydrocarbon radical is bornyl.

18. A catalyst as in claim 17 in which the vanadium compound is dichlorovanadylbornyloxide.

19. A catalyst as in claim 13 in which said cyclic hydrocarbon radical is norbornyl.

20. A catalyst as in claim 19 in which the vanadium compound is monochlorovanadyl dinorbornyloxide.

21. A catalyst as in claim 13 in which (B) is an alkyl aluminum halide.

22. A catalyst as in claim 21 in which the alkyl aluminum halide is an alkyl aluminum sesquihalide.

23. A catalyst as in claim 21 in which the alkyl aluminum halide is an alkyl aluminum dihalide.

24. A catalyst as in claim 13 in which (B) is a trialkyl aluminum.

References Cited

UNITED STATES PATENTS

| | | | |
|---|---|---|---|
| 2,924,594 | 2/1960 | Breslow | 252—431 X |
| 2,962,451 | 11/1960 | Schreyer | 252—431 X |
| 3,008,948 | 11/1961 | Stampa et al. | 252—431 X |
| 3,052,660 | 9/1962 | Osgan | 252—431 X |
| 3,455,974 | 7/1969 | Su | 252—431 X |

FOREIGN PATENTS

| | | | |
|---|---|---|---|
| 1,045,645 | 10/1966 | Great Britain | 252—431 |

PATRICK P. GARVIN, Primary Examiner

U.S. Cl. X.R.

260—88.2, 93.7, 94.9 B, 80.78